United States Patent
Antinora

(10) Patent No.: US 7,307,741 B2
(45) Date of Patent: Dec. 11, 2007

(54) PRINTER WITH INTEGRAL AUTOMATIC PRE-PRINTED SHEETS INSERTION SYSTEM

(75) Inventor: Terrance J. Antinora, West Irondequoit, NY (US)

(73) Assignee: Xerox Corporation, Norwalk, CT (US)

( * ) Notice: Subject to any disclaimer, the term of this patent is extended or adjusted under 35 U.S.C. 154(b) by 950 days.

(21) Appl. No.: 10/455,656

(22) Filed: Jun. 5, 2003

(65) Prior Publication Data

US 2004/0247353 A1    Dec. 9, 2004

(51) Int. Cl.
*G06F 15/00* (2006.01)
*G06K 1/00* (2006.01)

(52) U.S. Cl. .................. 358/1.12; 399/382; 399/391; 399/393

(58) Field of Classification Search ............... 358/1.12; 399/382, 393, 391
See application file for complete search history.

(56) References Cited

U.S. PATENT DOCUMENTS

| | | | |
|---|---|---|---|
| 4,248,525 A * | 2/1981 | Sterrett | 399/403 |
| 4,579,446 A | 4/1986 | Fujino et al. | |
| 4,587,532 A | 5/1986 | Asano | |
| 5,221,951 A | 6/1993 | Sakamoto | |
| 5,272,511 A | 12/1993 | Conrad et al. | |
| 5,327,207 A | 7/1994 | Otake et al. | |
| 5,457,524 A * | 10/1995 | Metcalf et al. | 399/382 |
| 5,489,969 A | 2/1996 | Soler et al. | |
| 5,559,595 A * | 9/1996 | Farrell | 399/382 |
| 5,570,172 A | 10/1996 | Acquaviva | |
| 5,596,416 A | 1/1997 | Barry et al. | |
| 5,710,968 A * | 1/1998 | Clark et al. | 399/382 |
| 5,995,721 A | 11/1999 | Rourke et al. | |

OTHER PUBLICATIONS

Xerox Disclosure Journal, vol. 16, No. 6, Nov./Dec. 1991, pp. 381-383, "Integration of Black Only and Color Printers," by Paul F. Morgan.

* cited by examiner

*Primary Examiner*—King Y. Poon
*Assistant Examiner*—Neil R McLean
(74) *Attorney, Agent, or Firm*—P. F. Morgan; R. Hutter

(57) ABSTRACT

An automatic pre-printed sheets insertion system integratable into an otherwise conventional printer, without requiring any additional space, yet enabling the feeding of selected pre-printed sheets into the printer output path, bypassing the print engine and fuser, yet integrating collated with the output of regular sheets being regularly fed and printed within the printer. It includes a separate insert sheets feeding system and feeding path for feeding insert sheets from a bi-directional sheet feed tray which can be mounted in the same location as a normal sheet feed tray. The separate path can be through an existing inverter. The special tray can be a dual-mode tray and/or a repositionable tray for feeding blank or other normal sheets in one direction for printing and for feeding insert sheets in the opposite direction to be integrated into the printer output.

6 Claims, 3 Drawing Sheets

PRINTER WITH INTEGRAL AUTOMATIC PRE-PRINTED SHEETS INSERTION SYSTEM

Figure 1:
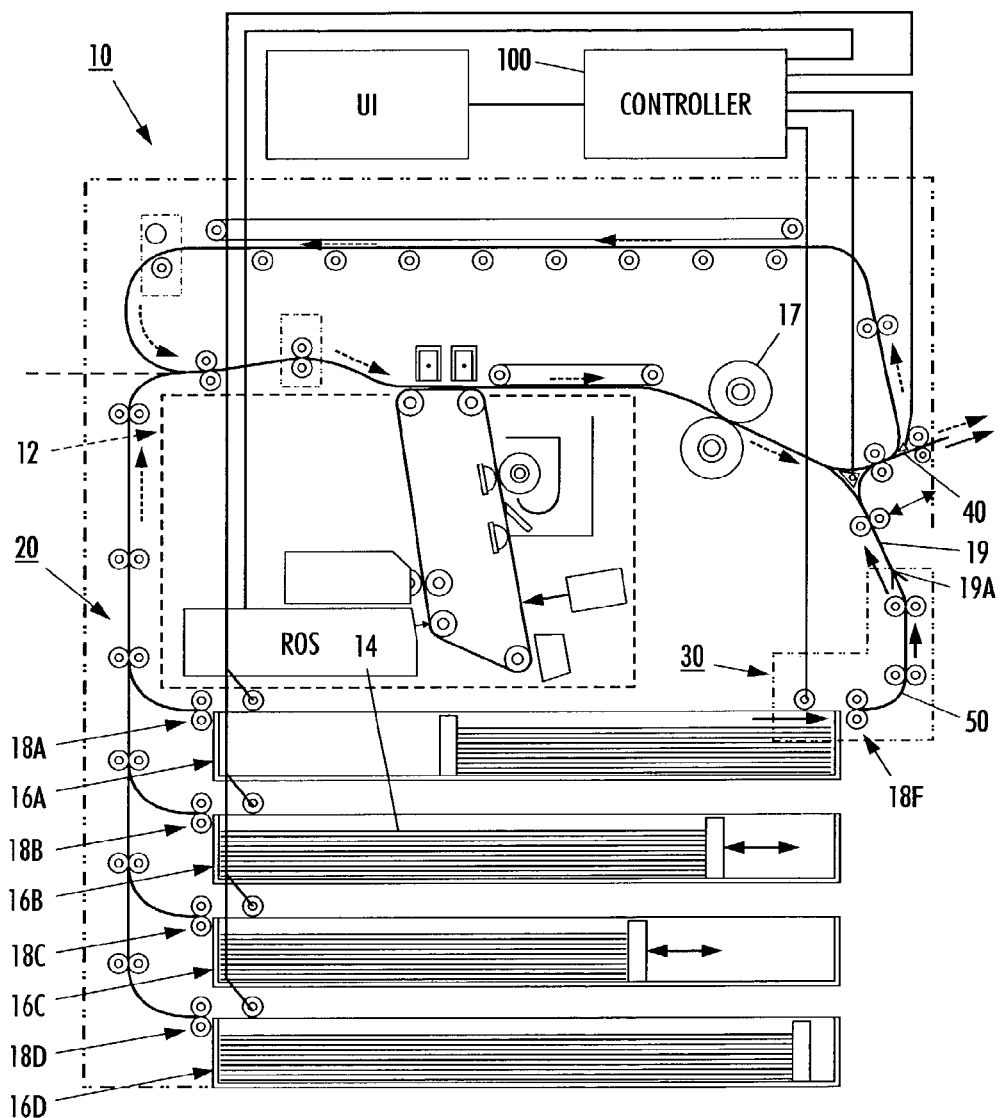

Customers with lower-cost or smaller office printers, especially black and white only printers, do not typically have the automatic special sheet insertions into print jobs capability of larger reproduction centers or printshops. The capability to generate print jobs with automatic on-line insertion, rather than manual insertion, of special pre-printed sheets, such as covers, fold-outs or color photographs, or other desired insert sheets, on special paper or otherwise, typically requires a customer to purchase and install expensive and bulky post-process "inserter" or "interposer" modules in between the printer and a finisher module for stapling, gluing or other sheet sets binding, in order to be able to automatically insert pre-printed documents into a print job. This adds to the initial cost of the printer purchase, and may also inhibit a printer purchase due to space constraints. Post-process inserters are typically a separate module that is post-fusing and pre-finishing. (Post-fusing sheet insertion is usually required to the fact that feeding pre-printed ink or toner sheets through a fuser may transfer the ink or toner to the fusing elements, causing fuser damage and/or image quality issues.)

The system of the disclosed embodiment enables automatic on-line special sheet insertions, even in a relatively small printer, without increasing the footprint of the printer or requiring a separate module, yet enables customers to insert pre-printed documents post-fusing and pre-finishing. This can also be a much less expensive alternative to typical present on-line interposer systems.

The system of the disclosed embodiment can utilize modifications of existing paper feed trays in a printer for blank (clean) sheets of print media, to feed insert sheets from that same tray, occupying approximately the same tray space. As shown, the pre-printed insertion media sheets may be fed in an opposite direction from the blank print media sheets normally from the same or a replacement tray. That is, at least one paper tray of the disclosed embodiment and its associated paper path would enable sheets to be fed from either direction from the same tray, in response to customer job input selections and customer sheet loading into the tray. Should the desired sequential sheet media feed be pre-printed, and customer input be as such, it would be fed in the process direction at the selected sequence (page) position in that print job into a paper path that would bypass the fuser and could use the existing path of the inverter in the printer. Once the pre-printed media was directed into the inverter, it would be directed out to the finishing device in the order desired for the insert. The same tray could then be re-filled with blank print media sheets to be fed in the standard sheet feeding direction to be used for normal printing—filling the processor paper path for marking. Thus enabling a single tray to be used for pre-printed media intended for insertion and/or blank media intended for marking, with minimal cost to the customer and no impact on customer space requirements.

Various types of sheet inserters (also known as "interposers"), and other printer output merging, tandem printing, etc., are known in the printing art. The following patent disclosures, and other art cited therein, are noted merely by way of some known examples: Canon U.S. Pat. No. 4,587,532 to Asano; Canon U.S. Pat. No. 4,579,446 to Fujino, et al; Xerox Corp. U.S. Pat. No. 5,272,511 issued Dec. 21, 1993 to Conrad et al; U.S. Pat. No. 5,489,969 issued Feb. 6, 1996 to Soler, et al; U.S. Pat. No. 5,995,721 to Rourke et al; and U.S. Pat. No. 5,570,172 to Acquaviva; T/R Systems U.S. Pat. No. 5,596,416 to Barry et al; and a "Xerox Disclosure" Journal publication by Paul F. Morgan of Nov.-December 1991, pp. 381-383, Vol. 16, No. 6 (on merging the output of a slow color printer into a paper tray of a high speed black and white printer for merged print jobs output).

A specific feature of the specific embodiments disclosed herein is to provide A method of automatically on-line inserting pre-printed special insertion sheets into desired page locations of pre-collated plural page printed documents while they are being printed and outputted by a printer, wherein the printer has plural sheet feeding trays for feeding blank print media to be printed by said printer from one side of said sheet feeding trays to the print engine of the printer, wherein pre-printed special insertion sheets are loaded into at least one of said sheet feeding trays and selectively fed to be outputted by the printer inserted at desired interposition page locations of said plural page printed documents being printed and outputted by the printer from said blank print media, wherein said pre-printed special insertion sheets loaded into said at least one of said sheet feeding trays are fed out from the opposite side of said sheet feeding tray, opposite from said feeding side of said blank print media, and wherein said pre-printed special insertion sheets are fed from said sheet feeding tray in a different sheet feeding path which substantially bypasses said print engine of said printer and outputs from said printer sequentially integrated into said pre-collated plural page printed documents without requiring a separate sheet inverter module.

Further specific features disclosed in the embodiments herein, individually or in combination, include those wherein said print engine includes a fuser for fusing images being printed onto said blank print media sheets, which fuser is bypassed by said pre-printed special insertion sheets being fed in said different sheet feeding path from said opposite side of said sheet feeding tray to said printer output; and/or wherein said printer has a sheet inverter with an inversion chute, and wherein said pre-printed special insertion sheets being fed in said different sheet feeding path from said opposite side of said at least one sheet feeding tray to said printer output are fed through said inversion chute; and/or wherein said at least one sheet feeding tray is laterally moveable between a first sheet feeder for feeding sheets from one side of said sheet feeding tray and a second sheet feeder for feeding sheets from the opposite side of the said sheet feeding tray; and/or wherein said at least one sheet feeding tray is laterally moveable between a first sheet feeder for feeding sheets from one side of said sheet feeding tray and a second sheet feeder for feeding sheets from the opposite side of the said sheet feeding tray; and/or wherein said at least one sheet feeding tray simultaneously holds a stack of said blank print media sheets in one area thereof and a stack of said pre-printed special insertion sheets in another area thereof, and wherein said blank print media sheets are fed from one side of said sheet feeding tray alternatingly with said pre-printed special insertion sheets being fed from the opposite side of said sheet feeding tray; and/or wherein said at least one sheet feeding tray simultaneously holds a stack of said blank print media sheets in one area thereof and a stack of said pre-printed special insertion sheets in another area thereof, and wherein said blank print media sheets are fed from one side of said sheet feeding tray alternatingly with said pre-printed special insertion sheets being fed from the opposite side of said sheet feeding tray; and/or in a printer with a sheet printing engine, a printed sheets output path, and plural sheet feeding trays for normally feeding blank print media sheets from one side of said sheet feeding trays to said print engine of said printer for printing plural page documents to be outputted pre-collated in said printer printed sheets output path; an automatic pre-printed sheets insertion system integral said printer for selectively integrating selected pre-printed sheets into said plural page printed documents in said printer printed sheets output path, said automatic pre-printed sheets insertion system including a separate insert sheets feeding system and a separate insert sheets feeding path, said separate insert sheets feeding system being adapted to selectively feed said pre-printed sheets loaded into at least one of said plural sheet feeding trays from a side of said least one plural sheet feeding tray opposite from said one side from which said blank print media sheets are normally fed, wherein said separate insert sheets feeding system feeds said pre-printed sheets into said separate insert sheets feeding path, wherein said separate sheet feeding path feeds said pre-printed sheets into said printer printed sheets output path integrated with said plural page printed documents in said printer printed sheets output path; and/or wherein said printer has a sheet inverter in said printer output path, and said separate sheet feeding path feeds said pre-printed sheets through said inverter; and/or wherein said printer has a sheet inverter with a sheet inverter chute in said printer output path, and said separate sheet feeding path feeds said pre-printed sheets up through said sheet inverter chute; and/or wherein said at least one sheet feeding tray is laterally moveable towards and away from said separate insert sheets feeding system; and/or wherein said at least one sheet feeding tray has two separate sheet stacking areas on opposite sides thereof for separately stacking therein said pre-printed sheets and said blank print media sheets for said opposite sides feeding thereof; and/or wherein said at least one sheet feeding tray is a special bi-directional and dual-function sheet feeding and sheet insertion tray which fits into the same tray area as a regular sheet feeding tray of said printer and is adapted to feed sheets stacked therein from opposite sides thereof, and/or in a printing method for a printer with a sheet printing engine, a printed sheets output path, and plural sheet feeding trays for normally feeding blank print media sheets from one side of said sheet feeding trays to said print engine of said printer for printing plural page documents to be outputted pre-collated in said printer printed sheets output path; providing an automatic pre-printed sheets insertion system integral said printer for selectively integrating selected pre-printed sheets into said plural page printed documents in said printer printed sheets output path, said automatic pre-printed sheets insertion system including a separate insert sheets feeding system and a separate insert sheets feeding path, said separate insert sheets feeding system selectively feeding said pre-printed sheets loaded into at least one of said plural sheet feeding trays from a side of said least one plural sheet feeding tray opposite from said one side from which said blank print media sheets are normally fed, said separate insert sheets feeding system feeding said pre-printed sheets into said separate insert sheets feeding path, said separate sheet feeding path feeding said pre-printed sheets into said printer printed sheets output path integrated with said plural page printed documents in said printer printed sheets output path.

The disclosed system may be operated and controlled by appropriate operation of conventional control systems. It is well-known and preferable to program and execute imaging, printing, paper handling, and other control functions and logic with software instructions for conventional or general purpose microprocessors, as taught by numerous prior patents and commercial printer products. Such programming or software may of course vary depending on the particular functions, software type, and microprocessor or other computer system utilized, but will be available to, or readily programmable without undue experimentation from, functional descriptions, such as those provided herein, and/or prior knowledge of functions which are conventional, together with general knowledge in the software or computer arts. Alternatively, the disclosed control system or method may be implemented partially or fully in hardware, using standard logic circuits or single chip VLSI designs.

The term "reproduction apparatus" or "printer" as used herein broadly encompasses various printers, copiers or multifunction machines or systems, xerographic or otherwise, unless otherwise defined in a claim. The term "sheet" herein refers to a usually flimsy physical sheet of paper, plastic, or other suitable physical substrate for images, whether precut or web fed. A "copy sheet" may be abbreviated as a "copy" or called a "hardcopy." A "print job" is normally a set of related sheets, usually one or more collated copy sets copied from a set of original document sheets or electronic document page images, from a particular user, or otherwise related. A "simplex" document or copy sheet is one having its image and any page number on only one side or face of the sheet, whereas a "duplex" document or copy sheet has "pages", and normally images, on both sides, that is, each duplex sheet is considered to have two opposing sides or "pages" even though no physical page number may be present.

As to specific components of the subject apparatus or methods, or alternatives therefor, it will be appreciated that, as is normally the case, some such components are known per se in other apparatus or applications, which may be additionally or alternatively used herein, including those from art cited herein. For example, it will be appreciated by respective engineers and others that many of the particular component mountings, component actuations, or component drive systems illustrated herein are merely exemplary, and that the same novel motions and functions can be provided by many other known or readily available alternatives. All cited references, and their references, are incorporated by reference herein where appropriate for teachings of additional or alternative details, features, and/or technical background. What is well known to those skilled in the art need not be described herein.

Figure 2:
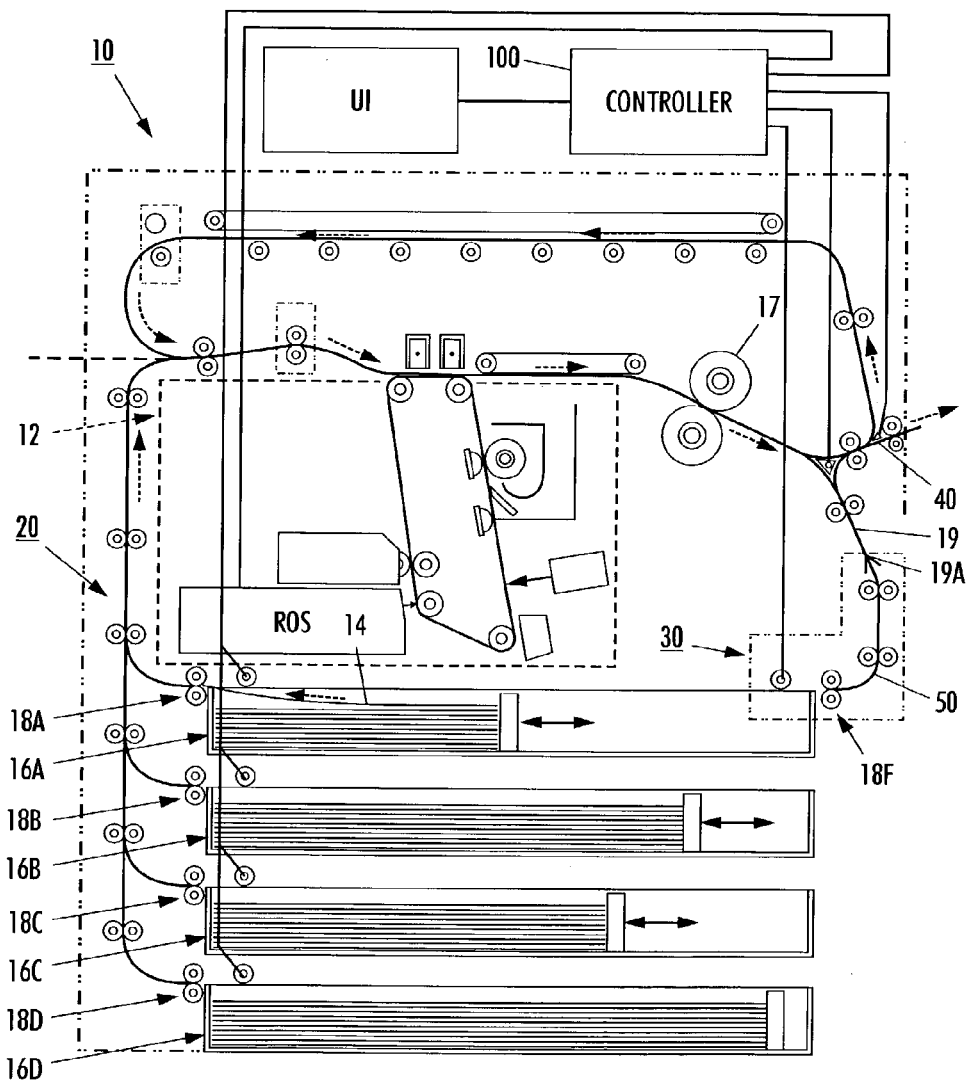
Figure 3:
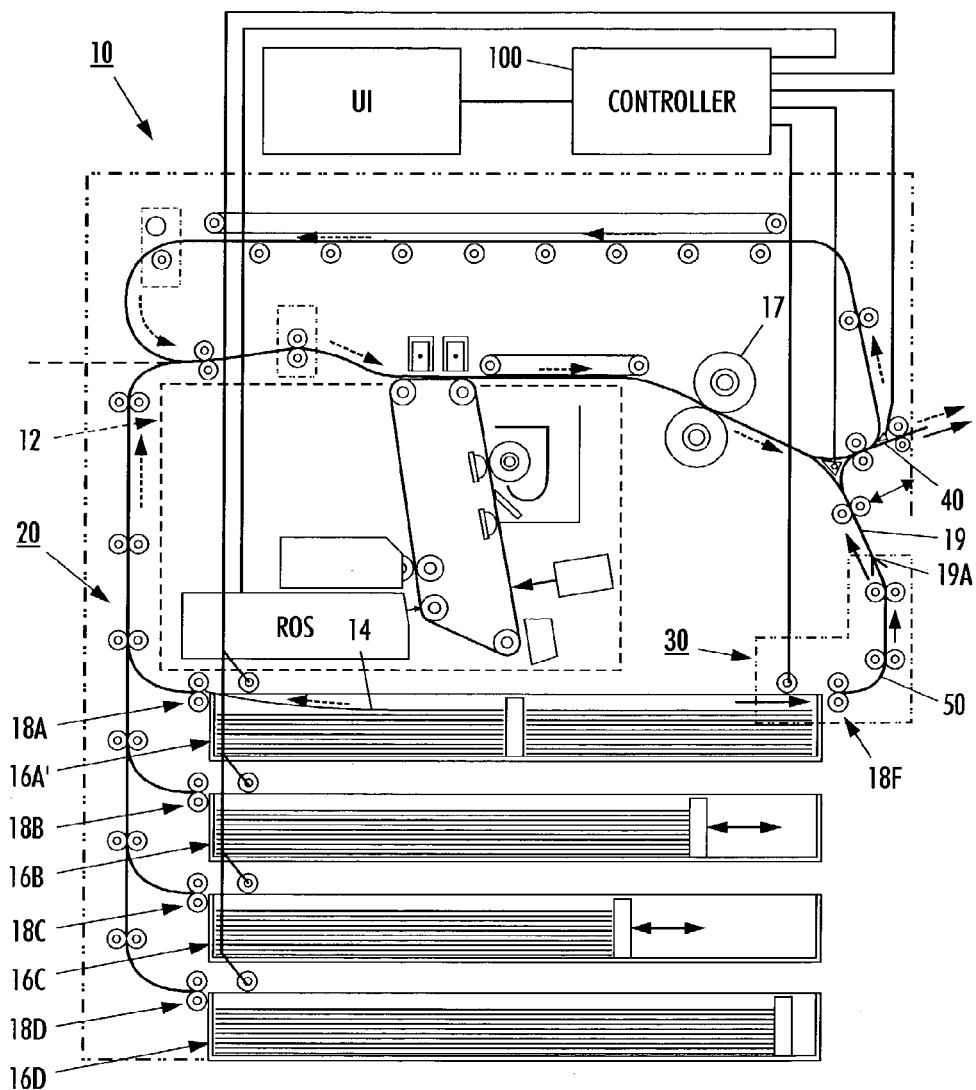

Various of the above-mentioned and further features and advantages will be apparent to those skilled in the art from the specific apparatus and its operation or methods described in the examples below, and the claims. Thus, the present invention will be better understood from this description of these specific embodiments, including the drawing figures (which are approximately to scale) wherein:

FIG. 1 is a schematic side view of one example of an otherwise conventional xerographic printer with one example of the subject automatic integral on-line pre-printed sheets insertion system, showing it's operating position or mode for inserts sheet feeding from one end of a sheet feed tray, such as pre-printed insert sheets, for merging them into a multipage document print job, with movement arrows showing the sheet insertion path;

FIG. 2 is the same as FIG. 1, illustrating the alternate operating position or mode of this exemplary automatic integral on-line pre-printed sheets insertion system, for normal sheet feeding and printing, with lateral movement of the same illustrated sheet feed tray to a separate sheet feeding position for normal sheet feeding of normal sheets loaded into that sheet feed tray, but feeding those normal sheets from the opposite end of the tray to be printed; and FIG. 3 is the same printer example as in FIGS. 1 and 2, but is illustrating a somewhat different example of the subject automatic integral on-line pre-printed sheets insertion system, also providing a bi-directional feeding dual function normal sheet feeding and special sheet insertion tray, but which tray in this example is larger and does not need to move in between the two different modes of operation, and can separately load therein and feed both regular print media sheets and special insert sheets.

Referring now to the two specific exemplary embodiments of the Figures, there is show an otherwise conventional xerographic printer 10 in all three Figures, which therefor need not be described in any detail herein. In FIGS. 1 and 2 this printer 10 has a first example of an automatic integral on-line pre-printed sheets insertion system 20. In FIG. 3, the printer 10 a slightly different automatic integral on-line pre-printed sheets insertion system 30.

The exemplary printer 10 conventionally has a print engine 12 for printing selected print media sheets 14 fed from one side of selectable plural sheet feed trays 16A, 16B, 16C, 16D by respective sheet feeders 18A, 18B, 18C, 18D. Conventionally, the sheets being printed in the print engine 12 pass through a fuser 17. (Such a fuser is often not suitable for passing pre-printed sheets therethrough, as previously noted.) The printer 10 then passes printed paper past or through a conventional optional sheet inverter 19 for or within a printer output path 40. Operations are conventionally controlled by a controller 100, as described above, with incoming electronic PDL or other electronic print job printing and insert instructions and/or customer GUI selections.

Both sheets insertion systems 20 and 30 here add at least one additional inserter sheet feeder 18F, which may the same as the other sheet feeders 18A-D, or otherwise conventional, but is oppositely positioned therefrom. Also added is a sheet insertion path 50, here extending from the inserter sheet feeder 18F up through the inverter chute 19A of the inverter 19 and thus directly into the printer output path 40, to merge therewith. The sheet insertion path 50 thus bypasses the print engine 12 and fuser 17, so as to provide post-printing sheet insertion, yet is accomplished entirely within the printer 10 without increasing space requirements.

As seen in either the system 20 of FIGS. 1 and 2 or the system 30 of FIG. 3, a customer can be provided with automatic sheet insertion capability simply by loading pre-printed media or other insertion sheets, of any desired size capable of fitting into a selected sheet feeding tray, such as 16A or 16A'. There is no requirement to purchase, install and maintain an expensive and space consuming post-process inserter module.

In the system 20 of FIGS. 1 and 2, the sheet feed tray 16A is laterally slidable by the operator, or automatically motor driven, between two different sheet feeding positions. In the insert sheets feeding position of FIG. 1 the tray 16A slides all the way to the right to position under the inserter sheet feeder 18F, and sheets stacked in this tray are sequentially fed out on command from the right side of this tray by the inserter sheet feeder 18F into the sheet insertion path 50. But this same tray 16A may be alternatively used for normal sheet feeding to the print engine, as in FIG. 2, when inserter operation from this tray is not needed, by instead loading this tray with sheets that are not harmed by running through the print engine and fuser and moving this tray all the way to the left to engage with the normal sheet feeder 18A.

In the system 30 of FIG. 3, the pre-printed media is loaded into the right side of a large paper tray 16A' which is large enough for one end of that inserted tray 16A' to extend to and slightly under the extra inserter sheet feeder or feedhead 18F which selectably feeds the customer selected stock into the inserter path 50 when activated by the controller 100. The pre-printed media so fed will would follow the "inserter paper path 50, entering through the existing inverter 19 paper path and then exiting to the finishing device via the same printer output path as the printed sheets. The other sheets of the print job meanwhile are fed and printed in the normal printer process from selected paper trays.

The printer output will be regularly printed media with pre-printed media inserted at the desired locations within the print job. For example, pre-printed color covers inserted at the beginning and end of a black and white document. Note that the original intended use of any printer paper tray need not be inhibited or interfered with by the present system.

The subject dual mode, dual use, bi-directional feed trays may be provided in essentially the same frames or tracks and space of the existing single use, single mode, paper feed tray insertion slots or drawers. They may be either the insertable and removable cassette type or the slide-out drawer type of paper tray.

Note also that the original sheet inversion paper path of the printer sheet inverter need not be compromised by the new inserter paper path. Sheets being duplex printed in the print engine may still be conventionally passed through the original sheet inverter paper path.

The system 30 of FIG. 3 has other capabilities. Especially for print media of standard letter size or smaller size to be fed for printing in the long-edge feed direction, the bi-directional feed tray 16A' can be used as a dual purpose tray. This enables the customer to insert and leave in pre-printed special insert media yet also maintain normal paper stock capacity by allowing the customer to load both unmarked and pre-printed insert stock into this same tray 16A', side by side. In this example the customer will load the desired pre-printed media in the right side of the tray 16A' and blank media in the left side. That is, at least one sheet feeding tray has two separate sheet stacking areas on opposite sides thereof for separately stacking therein pre-printed sheets and blank print media sheets for opposite sides feeding thereof. The pre-printed media will feed out and follow the insert path while the blank media will feed out and follow the normal print media path, without requiring any repositioning of this tray. This would effectively double the capacity the original paper tray for many print jobs. Should the customer choose to purchase a machine capable of feeding from four such bi-directional feed trays, the paper capacity of the machine would double for other than large sheet printing.

The disclosed systems may be readily implemented as an option for new-build equipment with little additional hardware and software cost. A printer conversion upgrade kit for this added feature may be provided for customers who desire this low cost option for adding a post-process sheet insertion system while maintaining their current system footprint.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of automatically on-line inserting pre-printed special insertion sheets into desired page locations of pre-collated plural page printed documents while they are being printed and outputted by a printer, wherein the printer has plural sheet feeding trays for feeding blank print media to be printed by said printer from one side of said sheet feeding trays to the print engine of the printer, wherein pre-printed special insertion sheets are loaded into at least one of said sheet feeding trays and selectively fed to be outputted by the printer inserted at desired interposition page locations of said plural page printed documents being printed and outputted by the printer from said blank print media, wherein said pre-printed special insertion sheets loaded into said at least one of said sheet feeding trays are fed out from the opposite side of said sheet feeding tray, opposite from said feeding side of said blank print media, and wherein said pre-printed special insertion sheets are fed from said sheet feeding tray in a different sheet feeding path which substantially bypasses said print engine of said printer and outputs from said printer sequentially integrated into said pre-collated plural page printed documents without requiring a separate sheet inverter module;

wherein said at least one sheet feeding tray is disposed generally below the print engine of the printer, and the print engine accepts sheets to be printed on an input side thereof; and wherein said printer has a sheet inverter with an inversion chute on an output side opposite the input side thereof, and wherein said pre-printed special insertion sheets being fed in said different sheet feeding path from said opposite side of said at least one sheet feeding tray to said printer output are fed through said inversion chute.

2. The method of automatically on-line inserting pre-printed special insertion sheets into desired page locations of pre-collated plural page printed documents while they are being printed and outputted by a printer of claim 1, wherein said print engine includes a fuser for fusing images being printed onto said blank print media sheets, which fuser is bypassed by said pre-printed special insertion sheets being fed in said different sheet feeding path from said opposite side of said sheet feeding tray to said printer output.

3. The method of automatically on-line inserting pre-printed special insertion sheets into desired page locations of pre-collated plural page printed documents while they are being printed and outputted by a printer of claim 1, wherein said at least one sheet feeding tray is laterally moveable between a first sheet feeder for feeding sheets from one side of said sheet feeding tray and a second sheet feeder for feeding sheets from the opposite side of the said sheet feeding tray.

4. The method of automatically on-line inserting pre-printed special insertion sheets into desired page locations of pre-collated plural page printed documents while they are being printed and outputted by a printer of claim 2, wherein said at least one sheet feeding tray is laterally moveable between a first sheet feeder for feeding sheets from one side of said sheet feeding tray and a second sheet feeder for feeding sheets from the opposite side of the said sheet feeding tray.

5. The method of automatically on-line inserting pre-printed special insertion sheets into desired page locations of pre-collated plural page printed documents while they are being printed and outputted by a printer of claim 1, wherein said at least one sheet feeding tray simultaneously holds a stack of said blank print media sheets in one area thereof and a stack of said pre-printed special insertion sheets in another area thereof, and wherein said blank print media sheets are fed from one side of said sheet feeding tray alternatingly with said pre-printed special insertion sheets being fed from the opposite side of said sheet feeding tray.

6. The method of automatically on-line inserting pre-printed special insertion sheets into desired page locations of pre-collated plural page printed documents while they are being printed and outputted by a printer of claim 2, wherein said at least one sheet feeding tray simultaneously holds a stack of said blank print media sheets in one area thereof and a stack of said pre-printed special insertion sheets in another area thereof, and wherein said blank print media sheets are fed from one side of said sheet feeding tray alternatingly with said pre-printed special insertion sheets being fed from the opposite side of said sheet feeding tray.

* * * * *